US012670923B2

(12) United States Patent
Brunet

(10) Patent No.: US 12,670,923 B2
(45) Date of Patent: Jun. 30, 2026

(54) MULTIBAND EQUALIZATION TUNING AND CONTROL BASED ON ARTIFICIAL INTELLIGENCE

(71) Applicant: SAMSUNG ELECTRONICS CO., LTD., Suwon-si (KR)

(72) Inventor: Pascal M. Brunet, Pasadena, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 18/150,132

(22) Filed: Jan. 4, 2023

(65) Prior Publication Data

US 2024/0221773 A1 Jul. 4, 2024

(51) Int. Cl.
*G10L 21/038* (2013.01)

(52) U.S. Cl.
CPC .................................. *G10L 21/038* (2013.01)

(58) Field of Classification Search
CPC .................................................... G10L 21/038
See application file for complete search history.

(56) References Cited

U.S. PATENT DOCUMENTS

| | | | | |
|---|---|---|---|---|
| 11,019,439 | B2 | 5/2021 | Tu et al. | |
| 11,265,668 | B1 | 3/2022 | Patil | |
| 2017/0178642 | A1* | 6/2017 | Liljeryd | G10L 19/265 |
| 2022/0182772 | A1 | 6/2022 | Dodds et al. | |
| 2022/0216881 | A1* | 7/2022 | Jeong | H03M 1/60 |
| 2024/0121570 | A1* | 4/2024 | Eronen | G06N 3/08 |

FOREIGN PATENT DOCUMENTS

KR 10-2254522 B1 5/2021

* cited by examiner

*Primary Examiner* — Mohammad K Islam
(74) *Attorney, Agent, or Firm* — Sherman IP LLP; Kenneth L. Sherman; Steven Laut

(57) ABSTRACT

One embodiment provides a computer-implemented method that includes accessing an artificial intelligence model trained for a filterbank based on a control gain of the filterbank and a resulting frequency response gain. Based on a target frequency response gain inputted into the trained artificial intelligence model, a control gain is applicable to a filter in the filterbank is outputted. The target frequency response gain is obtained at a center frequency of the filter in the filterbank.

20 Claims, 8 Drawing Sheets

MULTIBAND EQUALIZATION TUNING AND CONTROL BASED ON ARTIFICIAL INTELLIGENCE

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to filterbanks (or filter banks) for multiband sound equalization, and in particular, to obtaining a target frequency response gain from a filterbank using a trained artificial intelligence model.

BACKGROUND

Multiband graphic equalizer uses frequency adjacent filters to obtain a desired frequency response. The gains of each filter is manually adjusted by trial and error until the target response is obtained. Adjacent filters interact with each other and iterative tuning by an expert is needed to obtain the desired equalization with good precision.

Interactions between filters make it difficult to obtain a given target equalization, i.e. specific gains at specific frequencies. It is an iterative and tedious task that requires expertise. Conventional algorithms based on linear approximation exist, but these have limited precision.

SUMMARY

One embodiment provides a computer-implemented method that includes accessing an artificial intelligence (AI) model trained for a filterbank based on a control gain of the filterbank and a resulting frequency response gain. Based on a target frequency response gain inputted into the trained AI model, a control gain applicable to a filter in the filterbank (for example, a respective control gain applicable to each filter in the filterbank) is outputted. The target frequency response gain is obtained at a center frequency of the filter in the filterbank.

Another embodiment includes a non-transitory processor-readable medium that includes a program that when executed by a processor performs obtaining a target frequency response gain from a filterbank using a trained AI model, including accessing, by the processor, an artificial intelligence model trained for a filterbank based on a control gain of the filterbank and a resulting frequency response gain. The processor further provides outputting, based on a target frequency response gain inputted into the trained AI model, a control gain applicable to a filter in the filterbank (for example, a respective control gain applicable to each filter in the filterbank). The processor additionally obtains the target frequency response gain at a center frequency of the filter in the filterbank.

Still another embodiment provides an apparatus that includes a memory storing instructions, and at least one processor executes the instructions including a process configured to access an AI model trained for a filterbank based on a control gain of the filterbank and a resulting frequency response gain. The process further outputs, based on a target frequency response gain inputted into the trained AI model, a control gain applicable to a filter in the filterbank (for example, a respective control gain applicable to each filter in the filterbank). Additionally, the process obtains the target frequency response gain at a center frequency of the filter in the filterbank.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to a computer-implemented method that includes accessing an artificial intelligence (AI) model trained for a filterbank (or filter bank) based on a control gain of the filterbank and a resulting frequency response gain. Based on a target frequency response gain inputted into the trained AI model, a control gain applicable to a filter in the filterbank (for example, a respective control gain applicable to each filter in the filterbank) is outputted. The target frequency response gain is obtained at a center frequency of the filter in the filterbank.

AI models may include a trained machine learning (ML) model (e.g., models, such as a neural network (NN), a convolutional NN (CNN), a deep NN (DNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes. A NN is interconnected layers of small units referred to as nodes that perform operations to detect patterns in data. Neurons are a basic building block of a NN that takes weighted values, performs a calculation and produces output. The input to the NN is the data/values that are passed to the neurons. A NN is made of several neurons stacked into layers. All intermediate layers are referred to as hidden layers, and the number of layers in a network determines the depth of the model.

Figure 1:
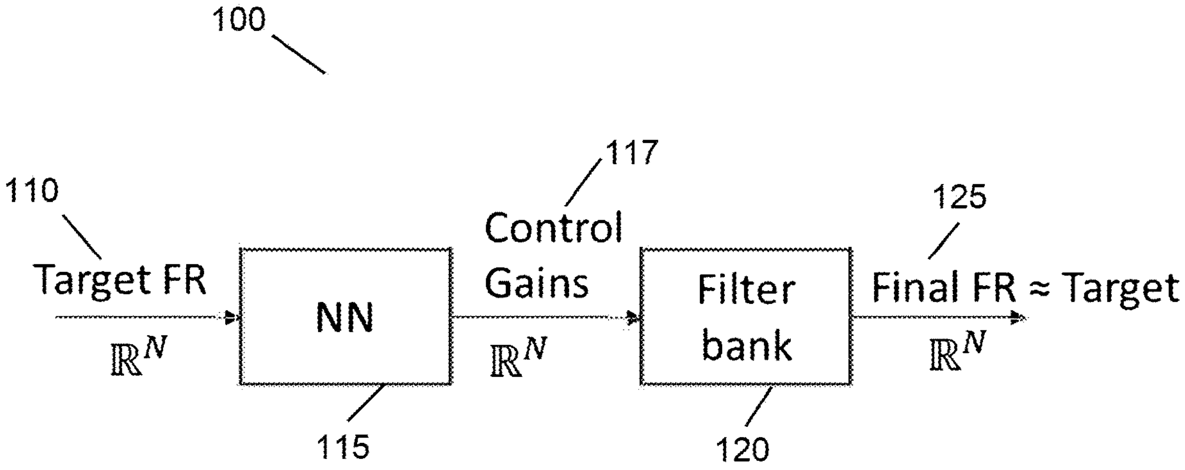
FIG. 1 illustrates a pipeline diagram associated with the disclosed technology for an artificial intelligence (AI) model employed for a given filterbank, according to some embodiments.

FIG. 1 illustrates a pipeline 100 diagram associated with the disclosed technology for an AI model employed for a given filterbank 120, according to some embodiments. In one or more embodiments, for a given filterbank 120 (e.g., graphic equalizer), an AI model, such as NN model 115, is trained to embed the relationship between filterbank's 120 control gain(s) 117 and final (resulting) frequency response (FR) gain 125. For inference, a target FR 110 is provided to the trained NN model 115 that outputs the respective control gain 117 to apply to each filter in the filterbank 120. Using the one or more embodiments, a user does not have to use iterative trial and error to obtain the target FR gain 125 and achieve the desired equalization. The NN model 115 ensures that the target gains are obtained at the center frequencies of each filter in the filterbank 120.

In some embodiments, training of an AI model, for the filterbank 120, is performed to develop a relationship between control gains 117 of the filterbank 120 and a resulting FR (Final FR 125) gain. Based on a target FR 110 gain inputted into the trained machine learning model (NN model 115), a control gain 117 applicable to a filter in the filterbank 120 (for example, a respective control gain applicable to each filter in the filterbank) is outputted. The control gain 117 applied to a filter in the filterbank 120 produces an output FR (Final FR 125 gain) that matches the target FR 110 gain within an allowable deviation. Obtaining the target FR 110 gain at a center frequency of a filter in the filterbank 120.

In some embodiments, for a given filterbank 120 composed of N filters (e.g. a graphic equalizer) centered at N specific frequencies $F_k$, k=1 . . . N, the NN model 115 is trained to learn the relationship between control gains 117 (inputs) and resulting FR (final FR 125 gain) gains (outputs) at $F_k$. For the NN model 115, the training: Inputs=M vectors of N scalars (dB control gain applied to each filter). The outputs=M vectors of N scalars (dB gains obtained each frequencies $F_k$). The NN model 115 inference provides that at inference time, the target FR 110 gains are input in the NN model 115 that calculates the corresponding control gains 117. These are applied in turn to the filterbank 120. The final FR 125 gain obtained from the filterbank 120 matches the target gains at the specified frequencies $F_k$.

Figure 2:
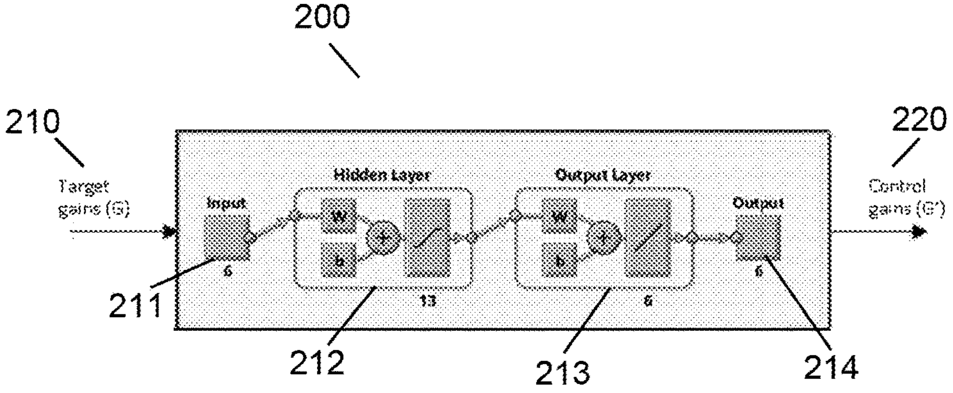
FIG. 2 illustrates an example pipeline for a neural network (NN) model that may be employed with the disclosed technology, according to some embodiments.

FIG. 2 illustrates an example pipeline for an NN model 200 that may be employed with the disclosed technology, according to some embodiments. In an example embodiment, the input 211 to the NN model 200 include target gains (G) 210 that are [dB] 6×1 vector of gains @ $F_k$. The output 214 include control gains (G') 220 that are [dB] 6×1 vector of gains @ $F_k$. The layers of the NN model 200 include one (1) hidden layer 212 with thirteen (13) nodes. The #weights are 13×6(hidden layer 212)+6×13(output layer 213)+biases=175 weights. The training data for the NN model 200 comprises 1200 samples, where each sample being a couple $\{G'_n, G_n\}$, where $G'_n$ is a vector of random control gain values generated using uniform distribution between [−20, 20] dB, and $G_n$ are the resulting FR gains obtained when applying the controls $G'_n$ to the reference filterbank. A uniform distribution of gains is used to systematically explore all possible control gain values applied to the filterbank. In one embodiment, the data split ratio is 70% training-15% validation-15% test.

Figure 3A:
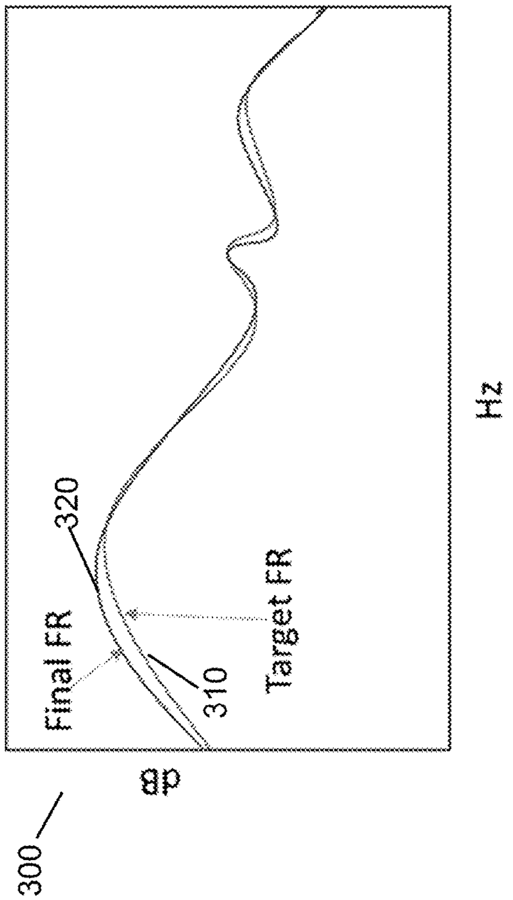
FIG. 3A illustrates an example graph showing the final frequency response (FR) and target FR for the disclosed technology, according to some embodiments.

FIG. 3A illustrates an example graph 300 showing the final FR 320 and target FR 310 for the disclosed technology, according to some embodiments. In one or more embodiments, the NN model 330 (FIG. 3B) adjusts gains of N filters to control the target FR 310 at M points with M>N. where M and N are integers. For example, the disclosed technology controls a filterbank 365 (e.g., FIG. 3C) having ten (10) filters to reach a target at thirty (30) frequencies.

Figure 3B:
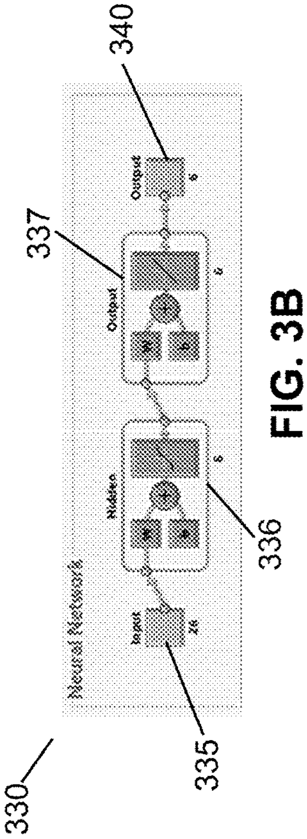
FIG. 3B illustrates another example NN model used for the resulting graph shown in FIG. 3A, according to some embodiments.

FIG. 3B illustrates another example NN model 330 used for the resulting graph 300 shown in FIG. 3A, according to some embodiments. The input 335 to the NN model 330 includes target G that are [dB] 26×1 vector of gains @ $F_k$. The output 340 include G' that are [dB] 6×1 vector of gains @ $F_k$. The layers of the NN model 330 include one (1) hidden layer 336 with six (6) nodes. The #weights are 26×6(hidden layer 336)+6×26(output layer 337)+biases=204 weights.

Figure 3C:
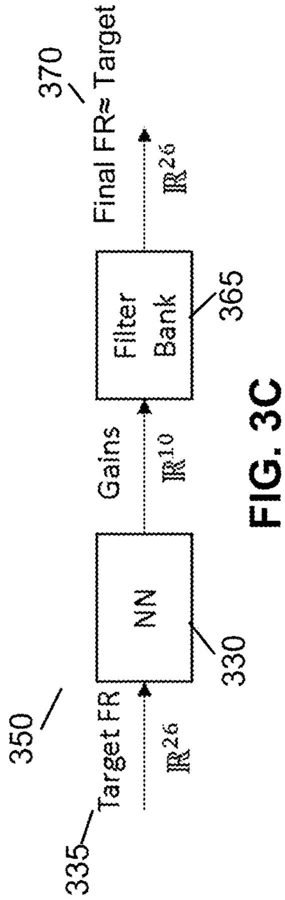
FIG. 3C illustrates an example pipeline employed for the resulting graph shown in FIG. 3A, according to some embodiments.

FIG. 3C illustrates an example pipeline 350 employed for the resulting graph 300 shown in FIG. 3A, according to some embodiments. The Target FR 335=dB vector$\in \mathbb{R}^{26}$ at ⅓ octave frequencies from 20 to 20 kHz. The Gains=dB vector$\in \mathbb{R}^{10}$ for a filterbank 365 with ten (10) filters. The NN model 330 operates on the filterbank 365 to result in the Final FR 370 gain.

Figure 4:
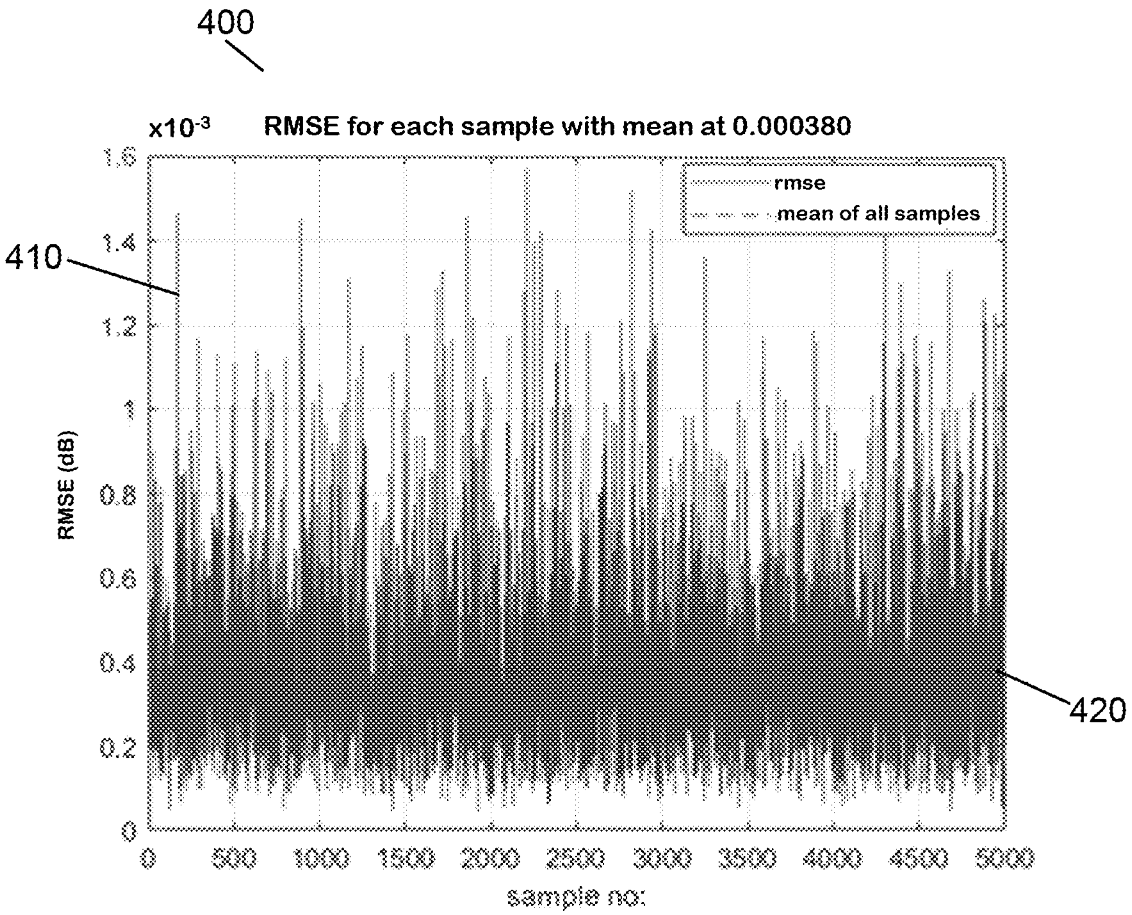
FIG. 4 illustrates a graph of root mean square error (RMSE) versus sample numbers for an example of the disclosed technology, according to some embodiments.

FIG. 4 illustrates a graph 400 of root mean square error (RMSE) 410 versus test sample numbers for an example of the disclosed technology, according to some embodiments. The mean of all samples 420 is shown as a reference. The graph 400 shows the RMSE 410 for each sample with the mean of all samples 420 equal to 0.000380 dB.

Figure 5:
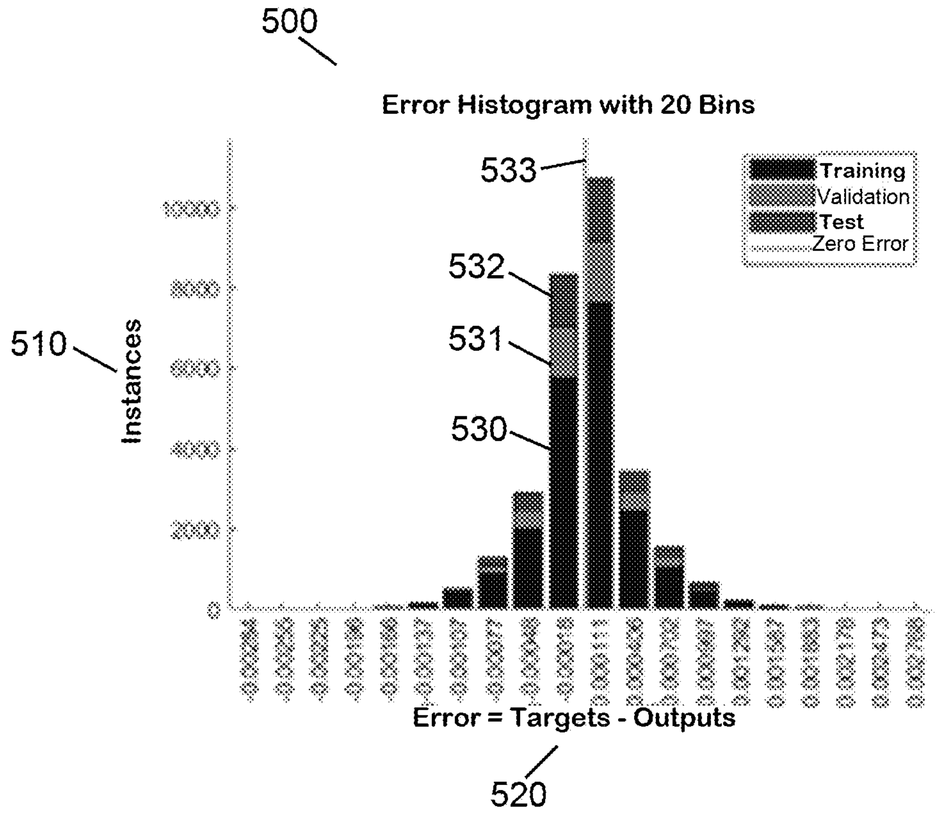
FIG. 5 illustrates an error histogram for an example of the disclosed technology, according to some embodiments.

FIG. 5 illustrates an error histogram 500 for an example of the disclosed technology, according to some embodiments. The error histogram 500 shows instances 510 versus errors 520, which is the targets minus the outputs in dB. The error histogram 500 shows the error histogram with 20 bins and shows errors for training 530, validation 531, test 532 and zero error 533

Figure 6A:
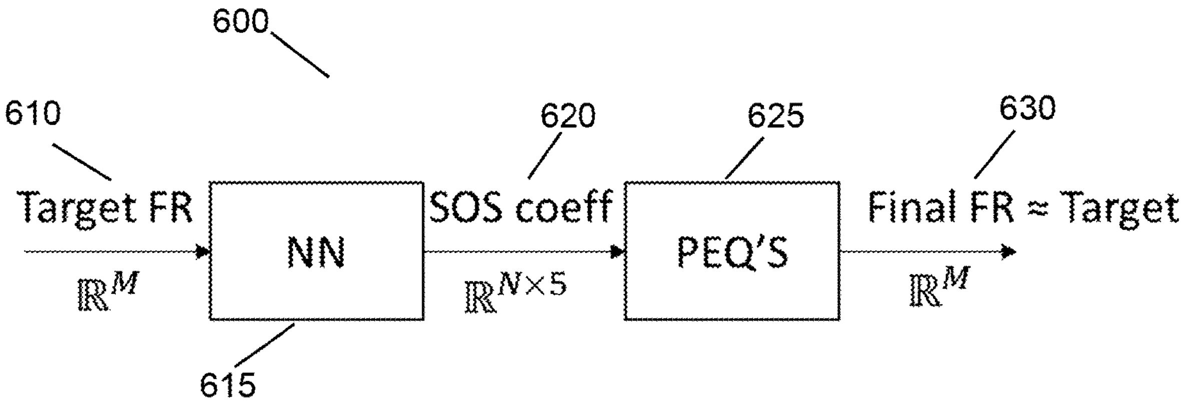
FIG. 6A illustrates an example pipeline for an NN model adjusting a given set of biquad filters of parametric equalizers (PEQ's), according to some embodiments.

FIG. 6A illustrates an example pipeline 600 for an NN model 615 adjusting a given set of biquad filters of parametric equalizers (PEQ's 625), according to some embodiments. The Target FR 610=dB vector$\in\mathbb{R}^M$. The (second order section (SOS)) coefficients 620=dB vector$\in\mathbb{R}^{Nx5}$ for a PEQ's 625. The NN model 615 operates on the PEQ's 625 to result in the Final FR 630.

Figure 6B:
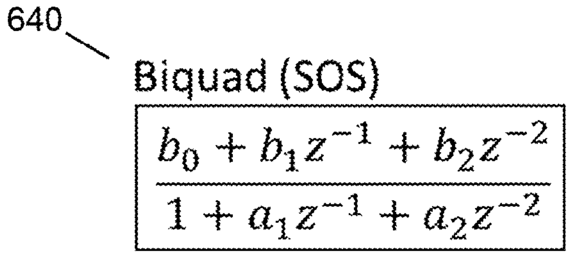
FIG. 6B illustrates an example biquad (second order section (SOS)) filter representation that may be implemented for the disclosed technology, according to some embodiments.
Figure 6C:
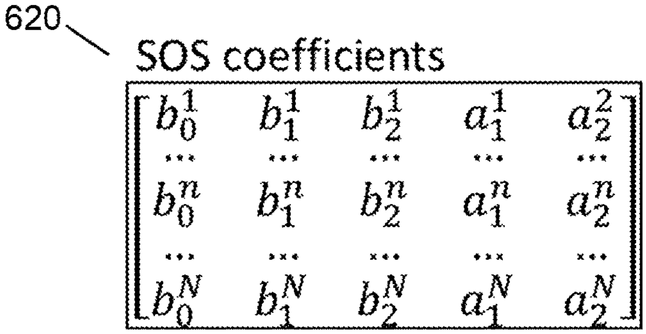
FIG. 6C illustrates a matrix of SOS coefficients for the biquad filter of FIG. 6B, according to some embodiments.

FIG. 6B illustrates an example biquad (SOS) filter representation 640 that may be implemented for the disclosed technology, according to some embodiments. FIG. 6C illustrates a matrix of SOS coefficients 620 for the example biquad (SOS) filter representation 640 of FIG. 6B, according to some embodiments.

Figure 7A:
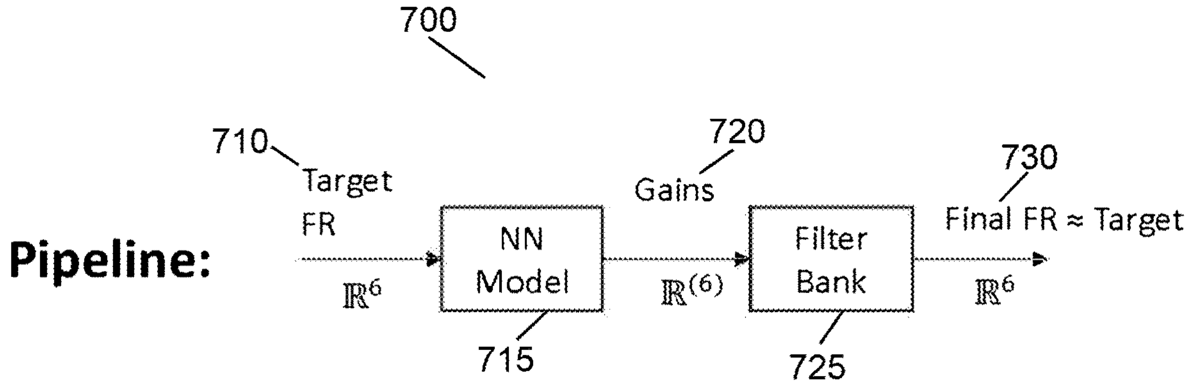
FIG. 7A illustrates an example pipeline employed for the resulting graph shown in FIG. 7B, according to some embodiments.
Figure 7B:
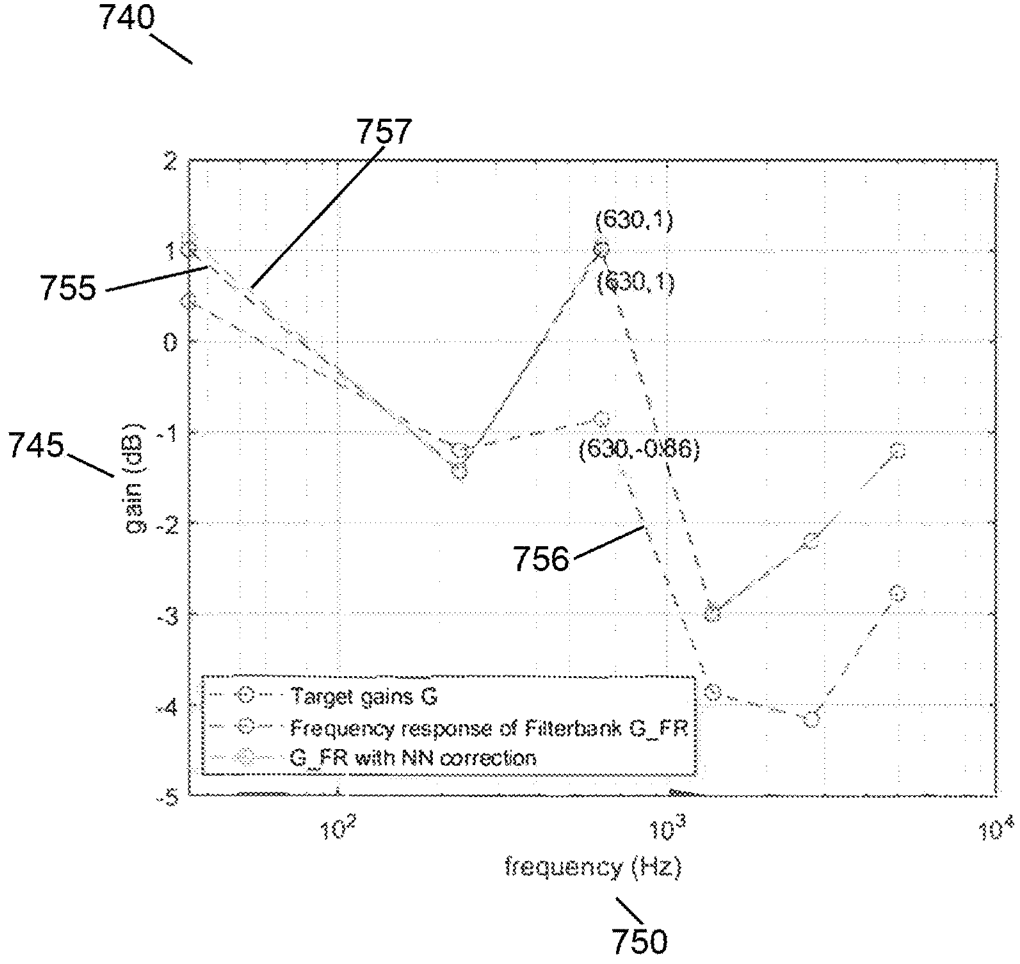
FIG. 7B illustrates a graph of gains versus frequency for the example pipeline shown in FIG. 7A, according to some embodiments.

FIG. 7A illustrates an example pipeline 700 employed for the resulting graph 740 shown in FIG. 7B, according to some embodiments. The Target FR 710 =dB vector$\in\mathbb{R}^6$. The control gain(s) 720=dB vector$\in\mathbb{R}^6$ for a filterbank 725 with six (6) filters. The NN model 715 operates on the filterbank 725 to result in the Final FR 730

FIGS. 7B illustrates a graph 740 of gains 745 versus frequency 750 for the example pipeline 700 shown in FIG. 7A, according to some embodiments. In the graph 740, the target gains G 755 are shown for comparison with the frequency response on the filterbank 725 (FIG. 7A) G_FR 756 and G_FR with NN correction 757. As shown, the final gains (G_FR with NN correction 757) obtained by the filterbank 725 with NN model 715 control are almost undistinguishable from the target gains G 755.

Figure 8:
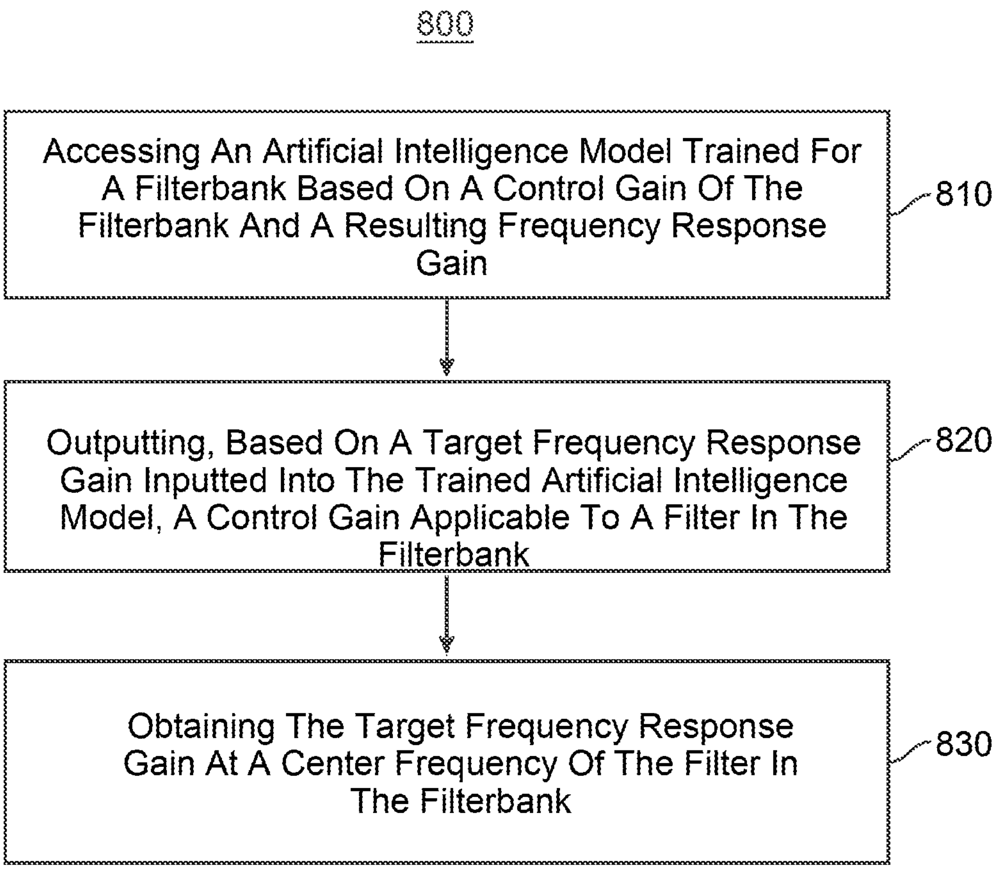
FIG. 8 illustrates a process for the disclosed technology implementing an NN model for a given filterbank, according to some embodiments.

FIG. 8 illustrates a process 800 for the disclosed technology implementing an AI model for a given filterbank (e.g., filterbank 120 (FIG. 1), filterbank 365 (FIG. 3C), filterbank 725 (FIG. 7A)), according to some embodiments. In one or more embodiments, in block 810 process 800 provides accessing a machine learning model (e.g., NN 115 (FIG. 1), NN 200 (FIG. 2), NN 330 (FIGS. 3B-C), NN 615 (FIG. 6A), NN 715 (FIG. 7A)) trained for a filterbank based on a control gain (e.g., control gain(s) 117 (FIG. 1), control gain(s) 720 (FIG. 7A)) of the filterbank and a resulting FR gain (e.g., final FR 125 gain (FIG. 1), final FR 370 gain (FIG. 3C), final FR 630 gain (FIG. 6A), final FR 730 gain (FIG. 7A)). In some embodiments, in block 820 process 800 provides outputting, based on a target FR response gain (e.g., target FR 110 gain (FIG. 1), target FR 335 gain (FIG. 3C), target FR 610 gain (FIG. 6A), target FR 710 gain (FIG. 7A)) inputted into the trained machine learning model, a control gain applicable to a filter in the filterbank (for example, a respective control gain applicable to each filter in the filterbank). In one or more embodiments, in block 830 process 800 further provides obtaining the target FR gain at a center frequency of the filter in the filterbank.

In some embodiments, process 800 further provides that the trained machine learning model (e.g., NN 115 (FIG. 1), NN 200 (FIG. 2), NN 330 (FIGS. 3B-C), NN 615 (FIG. 6A), NN 715 (FIG. 7A)) develops a relationship between the control gain of the filterbank and the resulting frequency response gain.

In one or more embodiments, process 800 additionally provides that the control gain applied to the filter produces an output frequency response gain that matches the target frequency response gain within an allowable deviation.

In some embodiments, process 800 further includes that the machine learning model comprises an NN (e.g., NN 115 (FIG. 1), NN 200 (FIG. 2), NN 330 (FIGS. 3B-C), NN 615 (FIG. 6A), NN 715 (FIG. 7A)).

In one or more embodiments, process 800 includes the feature that the NN provides that target frequency response gains are obtained at center frequencies of each filter in the filterbank.

In some embodiments, process 800 additionally provides the NN adjusts control gains of N filters to control target frequency response gains at M points (see, e.g., pipeline 600 (FIG. 6A)), N and M are integers, and M is greater than N.

In one or more embodiments, process 800 further provides the feature that the NN adjusts all coefficients of a given set of biquad filters to obtain the target frequency response gain (see, e.g., FIGS. 6A-C).

Figure 9:
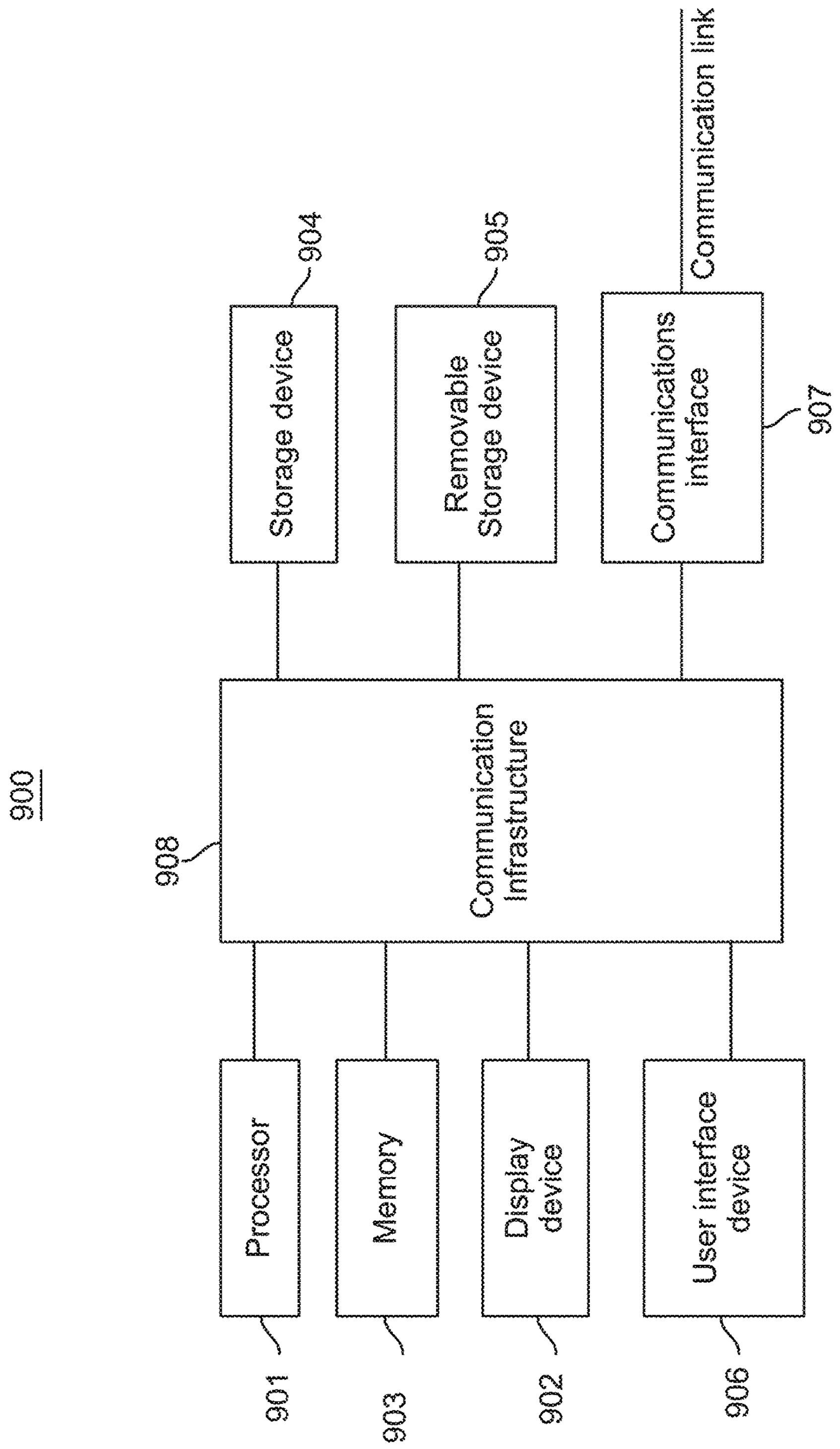
FIG. 9 illustrates a high-level block diagram showing an information processing system comprising a computer system useful for implementing the disclosed embodiments.

FIG. 9 is a high-level block diagram showing an information processing system comprising a computer system 900 useful for implementing the disclosed embodiments. Computer system 900 may be incorporated in an electronic device, such as a television, a sound bar, headphones, earbuds, tablet device, etc. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), user interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for process 800 (FIG. 8) may be stored as program instructions on the memory 903, storage device 904 and the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:

accessing an artificial intelligence model trained, using training data comprising pairs of control gain vectors and measured frequency response gains produced by a filterbank, to provide a mapping from a target frequency response gain vector to a corresponding vector of control gains for the filterbank;

inputting a target frequency response gain vector into the trained artificial intelligence model;

outputting, from a single inference of the trained artificial intelligence model and without iterative tuning, a vector of control gains respectively applicable to filters of the filterbank; and applying the vector of control gains to the filterbank to obtain frequency response gains at center frequencies of the filters that correspond to the target frequency response gain.

2. The computer-implemented method of claim 1, wherein the trained artificial intelligence model develops a learned relationship between the control gain vector and the resulting frequency response gain vector for the filterbank, and the filterbank is part of a multiband graphic equalizer.

3. The computer-implemented method of claim 1, wherein applying the vector of control gains produces output frequency response gains that match the target frequency response gain vector within an allowable deviation.

4. The computer-implemented method of claim 1, wherein the artificial intelligence model comprises a neural network.

5. The computer-implemented method of claim 4, wherein the training data comprises random control gain vectors generated using a uniform distribution and their corresponding measured frequency response gains obtained from the filterbank.

6. The computer-implemented method of claim 4, wherein the neural network is trained to adjust control gains of N filters to control target frequency response gains at M points, N and M are integers, and M is greater than N.

7. The computer-implemented method of claim 4, wherein the neural network is further configured to adjust coefficients of a set of biquad filters associated with the filterbank to obtain the target frequency response gain vector, and the adjustments of the coefficients are determined without iterative tuning to achieve the target frequency response gain across varying audio signal conditions.

8. A non-transitory processor-readable medium that includes a program that when executed by a processor performs applying a vector of control gains to a filterbank using a trained artificial intelligence model, comprising:

accessing, by the processor, an artificial intelligence model trained, using training data comprising pairs of control gain vectors and measured frequency response gains produced by a filterbank, to provide a mapping from a target frequency response gain vector to a corresponding vector of control gains for the filterbank;

inputting, by the processor, a target frequency response gain vector into the trained artificial intelligence model;

outputting, by the processor, from a single inference of the trained artificial intelligence model and without iterative tuning, a vector of control gains respectively applicable to filters of the filterbank; and applying, by the processor, the vector of control gains to the filterbank to obtain frequency response gains at center frequencies of the filters that correspond the target frequency response gain.

9. The non-transitory processor-readable medium of claim 8, wherein the trained artificial intelligence model develops a learned relationship between the control gain vector and the resulting frequency response gain vector for the filterbank, and the filterbank is part of a multiband graphic equalizer.

10. The non-transitory processor-readable medium of claim 8, wherein applying the vector of control gains produces output frequency response gains that match the target frequency response gain vector within an allowable deviation.

11. The non-transitory processor-readable medium of claim 8, wherein the artificial intelligence model comprises a neural network.

12. The non-transitory processor-readable medium of claim 11, wherein the training data comprises random control gain vectors generated using a uniform distribution and their corresponding measured frequency-response gains obtained from the filterbank.

13. The non-transitory processor-readable medium of claim 11, wherein the neural network is trained to adjust control gains of N filters to control target frequency response gains at M points, N and M are integers, and M is greater than N.

14. The non-transitory processor-readable medium of claim 11, wherein the neural network is further configured to adjust coefficients of a set of biquad filters associated with the filterbank to obtain the target frequency response gain vector, and the adjustments of coefficients are determined without iterative tuning to achieve the target frequency response gain across varying audio signal conditions.

15. An apparatus comprising:

a memory storing instructions; and at least one processor executes the instructions including a process configured to:

access an artificial intelligence model trained, using training data comprising pairs of control gain vectors and measured frequency response gains produced by a filterbank, to provide a mapping from a target frequency response gain vector to a corresponding vector of control gains for the filterbank;

input a target frequency response gain vector into the trained artificial intelligence model;

output, from a single inference of the trained artificial intelligence model and without iterative tuning, a vector of control gains respectively applicable to filters of the filterbank; and apply the vector control gains to the filterbank to obtain frequency response gains at center frequencies of the filters that correspond to the target frequency response gain.

16. The apparatus of claim 15, wherein the trained artificial intelligence model develops a learned relationship between the control gain vector and the resulting frequency response gain vector for the filterbank, and the filterbank is part of a multiband graphic equalizer.

17. The apparatus of claim 15, wherein applying the vector of control gains produces output frequency response gains that match the target frequency response gain vector within an allowable deviation.

18. The apparatus of claim 15, wherein the artificial intelligence model comprises a neural network, and the training data comprises random control gain vectors generated using a uniform distribution and their corresponding measured frequency response gains obtained from the filterbank.

19. The apparatus of claim 18, wherein the neural network is trained to adjust control gains of N filters to control target frequency response gains at M points, N and M are integers, and M is greater than N.

20. The apparatus of claim 18, wherein the neural network is further configured to adjust coefficients of a set of biquad filters associated with the filterbank to obtain the target frequency response gain vector, and the adjustments of the coefficients are determined without iterative tuning to achieve the target frequency response gain across varying audio signal conditions.

* * * * *